United States Patent Office 3,769,290
Patented Oct. 30, 1973

3,769,290
NOVEL HERBICIDES
George Levitt, Wilmington, Del., assignor to E. I. du Pont
de Nemours and Company, Wilmington, Del.
No Drawing. Filed June 28, 1972, Ser. No. 267,201
Int. Cl. C07d 51/30
U.S. Cl. 260—260                             3 Claims

ABSTRACT OF THE DISCLOSURE 3-(dicyclopropylmethyl)-6-methyluracils having the following formula:

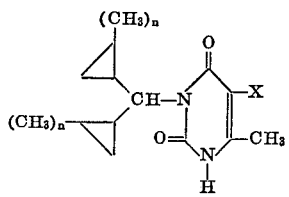

wherein:

X is hydrogen, methyl, or halogen; and
$n$ is 0 or 1;

are selective preemergence herbicides which control pigweed and many other weeds at a rate of application of $\frac{1}{16}$ lb. per acre without injury to valuable crops, such as wheat, corn, rice, or soybeans. At $\frac{1}{4}$ lb. per acre, these uracils kill nearly all plants.

BACKGROUND OF THE INVENTION

This invention relates to novel herbicidal substituted uracils, which are especially useful for the control of pigweed.

U.S. Pat. No. 3,235,357 discloses a large number of herbicidal uracils, which can be represented by one of the two tautomeric formulas below:

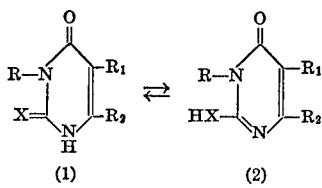

wherein R can be, among others, an alkyl, aryl, aralkyl, alkenyl, cycloalkyl, cycloalkenyl, cycloalkylalkyl, and cycloalkenylalkyl; $R_1$ can be, among others, a halogen or a lower alkyl; $R_2$ can be, among others, a $C_1$-$C_5$ alkyl; and X is oxygen or sulfur.

Various herbicidal uracils also are known from French Pat. No. 1,270,771.

It is to be noted that neither U.S. 3,235,357 nor French 1,270,771 discloses a uracil having any dicycloalkylmethyl substitutent in the 3-position.

SUMMARY OF THE INVENTION

According to this invention, it has now been discovered that certain 3-(dicyclopropylmethyl)-6-methyluracils are very potent herbicides that can be used, for example, as soil sterilants. These uracils also have a unique ability to control pigweed, even at very low rates of application at which they do not cause injury to many valuable crops.

The novel herbicidal uracils of the present invention can be represented by the following Formula 3:

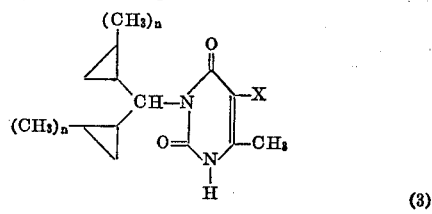

wherein:

X is hydrogen, methyl, or halogen; and
$n$ is 0 or 1.

The most active compounds of Formula 3 are those where X is chlorine or bromine, and $n$ is 0.

DETAILED DESCRIPTION OF THE INVENTION

The uracils of this invention can be prepared by the reaction of an N-(dicyclopropylmethyl)-3-aminocrotonamide with phosgene in tetrahydrofuran followed by treatment with aqueous sodium hydroxide and then acidification of the aqueous solution to precipitate the uracil as illustrated in the following reaction scheme:

(A)
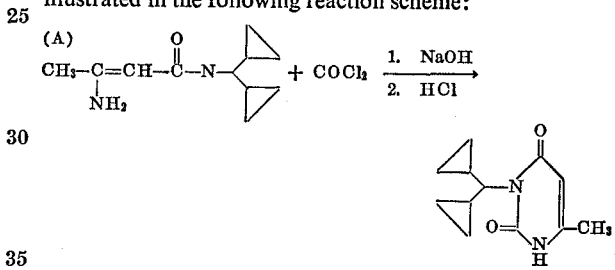

Halogenation of the 3-(dicyclopropylmethyl)-6-methyl uracils in the 5-position can be carried out as shown below:

(B)
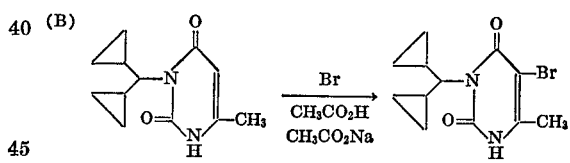

These methods are described in J. Am. Chem. Soc. 61, 1015 (1939); Ann., 305, 314; Ann., 352, 242 and Ann., 441, 192.

Another method of preparing the uracils of this invention is illustrated by the following equations:

(C)
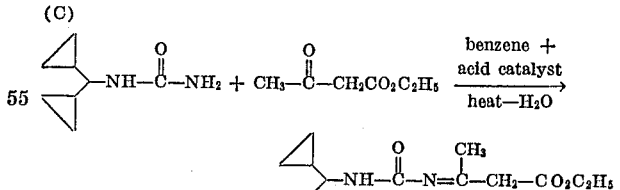

(D)
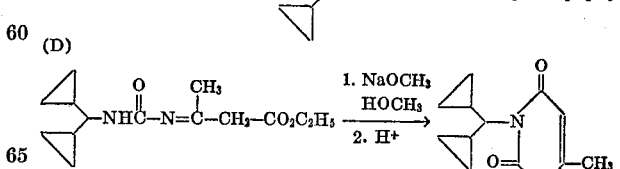

According to Equation C, a (dicyclopropylmethyl)urea is heated with acetoacetic acid ester (or α-methyl or α-fluoroacetoacetic acid ester) and a nonvolatile, protic acid catalyst, such as sulfuric, phosphoric, or p-toluenesulfonic acid in a neutral solvent at reflux with continuous water removal. After all of the water has been removed, the solvent is stripped and the residue taken up in a lower alcohol, preferably methanol or ethanol, containing a base such as a sodium alkoxide. After a short reflux, the solvent is removed, and the residue is taken up in water and acidified to precipitate the desired product. The 5-fluoro and 5-methyl substituted compounds of this invention are preferably prepared according to Equations C and D.

The N-(dicyclopropylmethyl)-3-aminocrotonamide intermediates are prepared by the reaction of 1,1-dicyclopropylmethylamine with diketene as illustrated in Equation E.

(E)

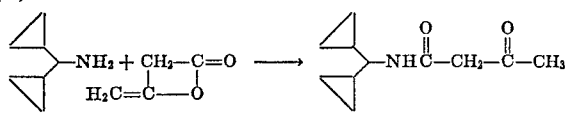

followed by treatment of the acetoacetamide product with anhydrous ammonia as shown in Equation F.

(F)

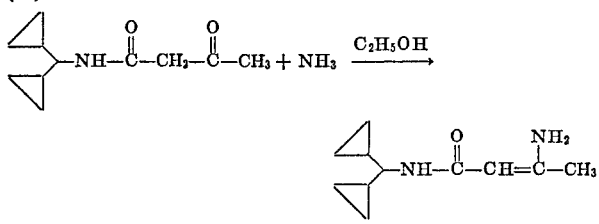

3 - [bis(2 - methylcyclopropyl)methyl]-6-methyluracils are prepared by the same reactions as the corresponding 3 - (dicyclopropylmethyl)-6-methyluracils from appropriate starting materials.

The preparation of certain novel uracils of the present invention is now illustrated by the following examples of preferred processes, wherein all parts, proportions, and percentages are by weight unless otherwise indicated.

EXAMPLE 1

3-(dicyclopropylmethyl)-6-methyluracil

To a solution of 49 parts of phosgene in 200 parts of anhydrous tetrahydrofuran was added 80 parts of N-(dicyclopropylmethyl)-β-aminocrotonamide in 500 parts of tetrahydrofuran at such a rate that the reaction temperature rose to 40–45° C. The reaction mixture was stirred and heated to reflux for two hours after the addition was completed and then poured into a solution of 20 parts of sodium hydroxide in 250 parts of water. The aqueous phase was separated and the organic phase washed with 100 parts of 25% aqueous sodium hydroxide. The combined basic solutions were acidified to pH 3 to precipitate the uracil which was isolated by filtration. The crude material, M.P. 202–205° C., was recrystallized from ethanol to yield the pure uracil, M.P. 209–210° C.

EXAMPLE 2

5-bromo-3-(dicyclopropylmethyl)-6-methyluracil

To a solution prepared from 22 parts of 3-(dicyclopropylmethyl)-6-methyluracil, 250 parts of glacial acetic acid and 13 parts of anhydrous sodium acetate was added 18 parts of bromine in 50 parts of acetic acid. The mixture was warmed to 40–45° C. for three hours, poured into 1000 parts of ice and water, and the aqueous solution was extracted with three portions of 500 parts each of methylene chloride. The methylene chloride extracts were dried over magnesium sulfate, filtered and evaporated to yield the desired 5-bromouracil, which was triturated with a small amount of ethyl ether to give a crystalline material melting at 262–263.5° C.

Analysis.—Calcd. for $C_{12}H_{15}BrN_2O_2$ (percent): C, 48.32; H, 4.73; N, 9.39. Found (percent): C, 47.80; H, 5.07; N, 9.60.

The starting materials for the above reactions are made, for example, as follows:

N-(dicyclopropylmethyl)acetoacetamide

Fifteen parts of dicyclopropylmethylamine hydrochloride was mixed with 80 parts of ethyl ether, 25 parts of water and 5 parts of sodium hydroxide. The ether phase was separated, dried over magnesium sulfate and added with stirring to 40 parts of ethyl ether containing 8.4 parts of diketene. The product which precipitates out was removed by filtration, M.P. 83.5–84.5° C.

N-(dicyclopropylmethyl)-β-aminocrotonamide

Fifteen parts of N-(dicyclopropylmethyl)acetoacetamide was dissolved in 200 parts of ethanol, and the solution was saturated with anhydrous ammonia. The solution was allowed to stand overnight and the solvent was distilled off in vacuo. The product remaining after the removal of the solvent was suitable for use as an intermediate. After washing the solid with a small amount of ether, it melted at 126.5–127.5° C.

Analysis.—Calcd. for $C_{11}H_{18}N_2O$ (percent): C, 68.4; H, 9.35; N, 14.5. Found (percent): C, 68.29; H, 9.34; N, 14.39.

The following uracils are also prepared according to the methods described in this disclosure or previously described in U.S. Pat. 3,352,862.

5-chloro-3-(dicyclopropylmethyl)-6-methyluracil
3-(dicyclopropylmethyl)-5-iodo-6-methyluracil
3-(dicyclopropylmethyl)-5-fluoro-6-methyluracil
3-(dicyclopropylmethyl)-5,6-dimethyluracil
3-[bis(2-methylcyclopropyl)methyl]-6-methyluracil
3-[bis(2-methylcyclopropyl)methyl]-5-chloro-6-methyluracil
3-[bis(2-methylcyclopropyl)methyl-5-bromo-6-methyluracil
3-[bis(2-methylcyclopropyl)methyl]-5-fluoro-6-methyluracil
3-[bis(2-methylcyclopropyl)methyl]-5-iodo-6-methyluracil
3-[bis(2-methylcyclopropyl)methyl]-5,6-dimethyluracyl.

The novel compounds of this invention are useful for selective control of weeds in such crops as sugarcane, citrus, stone fruits, pineapple, dormant alfalfa and asparagus; they also are useful for general control of undesirable vegetation, including both broadleaf and grassy weeds; they are effective, for example, against perennial grasses such as quackgrass, Johnson grass and Bermuda grass, and are effective on highly adsorptive substrates such as railroad ballasts, heavy clay soil and soils high in organic matter.

The compounds can be applied preemergence, postemergence or as a directed postemergence treatment. Application rates range from ¼ to 25 kg. of active ingredient (hereafter, a.i.) per hectare. Method and rate of application depend upon such factors as use, crop, soil type, climatic conditions and weed population. Uniform distribution of the compounds is important, particularly in postemergence treatment.

These compounds may be combined with other known herbicides, for example in the manner described in more detail in U.S. Pat. No. 3,235,357.

The herbicidal activity of a representative compound of the present invention, 5-bromo-3-(dicyclopropylmethyl)-6-methyluracil, is shown in the following preemergence test.

Crops and weeds were planted in a Hatboro silt loam soil and treated preemergence with the compound at the rate of $\frac{1}{16}$ and ¼ lb. per acre. Twenty-eight days later the plant response was visually observed and recorded according to both a numerical code and a letter code. Numbers from 0 to 10 indicate the severity of the response, 0 meaning no response and 10 meaning that all the plants were affected (e.g., killed). In the letter code, C means chlorosis-necrosis, and G means growth retardation. The test results are shown in the table.

Soil-surface application

| Rate, lb./a. | Wheat | Rice | Crabgrass | Barn-yard-grass | Sorghum | Wild oats | Johnson grass | Dallis-grass | G. fox-tail | Ky. blue grass | B. rigidus | Goose-grass | Corn | Mus-tard | Dock | Pig-weed | Nut-sedge | Curly indigo | Morn-ing glory | Y. rocket | Tea-weed | Vel-vet-leaf | Jim-son-weed | Soy-bean |
|---|---|---|---|---|---|---|---|---|---|---|---|---|---|---|---|---|---|---|---|---|---|---|---|---|
| 1/16 | 0 | 2C | 2C,2G | 7C | 1C,2G | 1C | 2C | 1C | 1C | 9C | 2C | 2C | 0 | 10C | 8C | 10C | 0 | 10C | 1C | 9C | 9C | 8C | 10C | 0 |
| 1/4 | 10C | 10C | 10C | 10C | 10C | 10C | 10C | 10C | 10C | 10C | 10C | 10C | 10C | 10C | 10C | 10C | 0 | 10C | 10C | 10C | 10C | 10C | 10C | 10C |

Formulations

The uracils of this invention can be applied in a variety of formulations, including wettable powders, suspensions, emulsifiable concentrates, dusts, solutions, granules, pellets, etc., in a manner well known in the art. High strength compositions may also be prepared for use by local formulators in further processing.

These formulations include one or more compounds of Formula 3, and can include surfactants, solid or liquid diluents and other materials as required to produce the desired formulation. Anionic and nonionic surfactants are preferred. Surfactants are present in compositions of this invention in amounts up to about 20% by weight based on the total weight of the resulting composition. When larger amounts of surfactants are desired, mixing in the spray tank is most convenient.

The compositions are made by thoroughly blending the active ingredients with the diluent and other additives. Usually a grinding step, as in a hammer mill or fluid energy mill, is included. The particles in dust and powder preparations are preferably less than 50 microns in average diameter.

Preferred wettable powder formulations will contain 40% or more active ingredient together with sufficient surfactant and inert diluent to permit dispersion in water for spray application. Compositions intended for dust application will usually contain less than 50% active ingredient.

Water-soluble preparations can be made by mixing a uracil with a stoichiometric excess of an alkaline solubilizing agent. Solid bases having a pH of at least 9.5 in a 1% aqueous solution, such as sodium or potassium phosphate, silicates, carbonates, borates, oxides or hydroxides, are suitable.

Powdered compositions can be converted to granules by adding a liquid, treating mechanically, and usually, drying. Water-soluble binders, such as inorganic salts, urea, lignin, sulfonate, methylcellulose, and the like, can be included in these particulate formulations in amounts up to about 25% by weght of the finished granule or pellet.

Suspension formulations can be made in water, or in organic solvents, or in mixtures of water and water-miscible organic liquids in which the active ingredient has a solubility of less than about 0.1%. The preparations usually include, in addition to the active ingredient and liquid carrier, surfactants, viscosity control agents, antimicrobial agents, and other modifiers.

Solution formulations can be prepared in organic solvents. For such compositions, all that is required is practical solubility and stability of the active material in the chosen solvent. Although the uracils of this invention are soluble in low molecular weight halocarbons, alcohols and ketones, use of those solvents is undesirable because of their high volatility and hazards of flammability and/or toxicity. Salts of thes uracils are moderately soluble in aqueous systems.

All solution and suspension formulations can be used for direct low-volume applications.

Other plant growth regulants, fungicides, insecticides, nematocides, etc., may be included in the compositions discussed above. For flexibility in relative rate of use under differing conditions, tank-mixes are usually preferred.

Two agricultural formulations are described in the following Examples A and B, wherein all percentages are by weight.

EXAMPLE A

Aqueous suspension: Percent
5 - bromo - 3 - (dicyclopropylmethyl)-6-methyl-uracil _____ 25
Hydrated attapulgite _____ 2
Crude calcium ligninsulfonate _____ 10
Sodium dihydrogen phosphate _____ 0.5
Water _____ 61.5

The ingredients are ground together in a ball or roller mill until the solid particles have been reduced to diameters under 10 microns.

This formulation is useful for the control of annual and perennial weeds growing in firebreaks. A postemergence application of 25 kg. a.i./ha. in 600 liters of water gives excellent control of redroot pigweed (*Amaranthus retroflexus*), buckhorn plantain (*Plantago lanceolata*), broomsedge (*Andropogon virginicus*), annual ryegrass (*Lolium multiflorum*) and nutsedge (Cyperus spp.).

EXAMPLE B

Aqueous solution:                         Percent
3-(dicyclopropylmethyl)-6-methyluracil _____ 12.5
Potassium hydroxide _____ 3.6
Water _____ 83.9

The ingredients are combined and stirred to produce a solution.

The above formulation is extremely effective in controlling weeds growing along the edges of airport runways. A treatment applied preemergence at a rate of 12 kg. a.i./ha. in 250 liters of water gives excellent control of annual bluegrass (*Poa annua*), knotweed (Polygonum spp.), spurge (Euphorbia spp.) and pigweed (Amaranthus spp.).

In the following composition claims, the expression "consisting essentially" means that, in addition to the compounds recited in the claims, other components also may be present provided they do not adversely affect the operability of the composition for its intended use.

I claim:
1. A compound having the formula

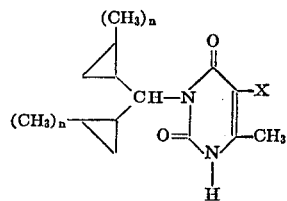

wherein:
X is hydrogen, methyl, or halogen; and
$n$ is 0 or 1.

2. The compound of claim 1 wherein X is bromine, and $n$ is 0.

3. The compound of claim 1 wherein X is chlorine, and $n$ is 0.

References Cited
UNITED STATES PATENTS
3,580,913    5/1971    Lutz _____ 260—260

ALEX MAZEL, Primary Examiner
A. M. T. TIGHE, Assistant Examiner

US. Cl. X.R.
260—482 R, 533 R, 561 A, 561 K; 71—92